United States Patent

Krystek et al.

(10) Patent No.: US 11,144,883 B2
(45) Date of Patent: Oct. 12, 2021

(54) INTELLIGENT SCHEDULING OF EVENTS

(71) Applicant: INTERNATIONAL BUSINESS MACHINES CORPORATION, Armonk, NY (US)

(72) Inventors: Paul Krystek, Highland, NY (US); Shikhar Kwatra, Morrisville, NC (US); Blaise Schaeffer, Durham, NC (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 15/971,122

(22) Filed: May 4, 2018

(65) Prior Publication Data

US 2019/0340579 A1 Nov. 7, 2019

(51) Int. Cl.
*G06Q 10/10* (2012.01)
*G06Q 10/02* (2012.01)
*G06N 20/00* (2019.01)
*G06F 16/28* (2019.01)
*G06F 16/2457* (2019.01)

(52) U.S. Cl.
CPC ... *G06Q 10/1093* (2013.01); *G06F 16/24578* (2019.01); *G06F 16/288* (2019.01); *G06N 20/00* (2019.01); *G06Q 10/02* (2013.01)

(58) Field of Classification Search
CPC .............................................. G06Q 10/1093
See application file for complete search history.

(56) References Cited

U.S. PATENT DOCUMENTS

| | | | |
|---|---|---|---|
| 6,047,260 | A | 4/2000 | Levinson |
| 2005/0165631 | A1 | 7/2005 | Horvitz |
| 2006/0294108 | A1 | 12/2006 | Adelson et al. |
| 2007/0005409 | A1 | 1/2007 | Boss et al. |
| 2007/0226033 | A1 | 9/2007 | Lopresti |
| 2009/0112677 | A1 | 4/2009 | Rhett |
| 2009/0165022 | A1* | 6/2009 | Madsen ............... G06Q 10/109 719/318 |
| 2009/0228361 | A1 | 9/2009 | Wilson |
| 2011/0137700 | A1 | 6/2011 | Hamalainen |
| 2016/0197968 | A1 | 7/2016 | Vasudevan et al. |
| 2017/0039527 | A1* | 2/2017 | Rangan ............... G06Q 10/1095 |
| 2017/0300869 | A1* | 10/2017 | Johnson ............. G06Q 10/1095 |

FOREIGN PATENT DOCUMENTS

WO 2016145265 A1 9/2016

OTHER PUBLICATIONS

Lee Wang et al, Task Matching and Scheduling in Heterogeneous Computing Environments Using a Genetic-Algorithm-Based Approach, Journal of Parallel and Distributed Computing 47, 8-22 (1997) (Year: 1997).*
Mike Brzozowski et al, groupTime: Preference-Based Group Scheduling, CHI 2006 Proceedings • Social Computing 2, pp. 1047-1056 (Year: 2006).*

\* cited by examiner

*Primary Examiner* — Andre D Boyce
(74) *Attorney, Agent, or Firm* — Griffiths & Seaton PLLC (57) ABSTRACT

Embodiments for intelligent scheduling of events by a processor. One or more events may be cognitively scheduled and/or assigned to one or more members from a plurality of group members according to learned relationships and responsibilities associated with the one or more events and the plurality of group members.

20 Claims, 6 Drawing Sheets

INTELLIGENT SCHEDULING OF EVENTS

BACKGROUND OF THE INVENTION

Field of the Invention

The present invention relates in general to computing systems, and more particularly, to various embodiments for intelligent scheduling of events by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices allow for the sharing of information between users in an increasingly user friendly and simple manner. The increasing complexity of society, coupled with the evolution of technology continue to engender the sharing of a vast amount of information between people.

SUMMARY OF THE INVENTION

Various embodiments for intelligent scheduling of events by a processor are provided. In one embodiment, by way of example only, a method for cognitive scheduling of events, again by a processor, is provided. One or more events may be cognitively scheduled and/or assigned to one or more members from a plurality of group members according to learned relationships and responsibilities associated with the one or more events and the plurality of group members.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

With the increased uses of various types of computing devices (aka "user equipment") such as, for example, wireless communication devices (e.g., IoT devices, smartphones, tablets, computers), each of these computing devices may enhance and improve various aspects of a user's daily activities and schedules. However, it can be very difficult to manage a user's complicated schedule and activities such as, for example, calendared and non-calendared scheduled events. Further complicating matters, participation in a group increases the challenge of managing one's schedule and activities particularly where a group may be a family group, a work group, or a social group (or a combination of groups). Given the numerous options for choices on how to best approach a given person's schedule to ensure success, it becomes nearly impossible for a given individual to know all the available choices and options along with attendant possible outcomes available to the user (e.g., choices that need to be made before an event) temporally as an event approaches on their schedule, including the effects of the choices that change based on their role in a group(s). A such, a need exists for intelligent scheduling of events.

Accordingly, various embodiments provide for cognitive scheduling of events by a processor. One or more events may be cognitively scheduled and/or assigned to one or more members from a plurality of group members according to learned relationships and responsibilities associated with the one or more events and the plurality of group members.

In one aspect, a user may have a specific role in one of many different types of groups (e.g., family groups, work groups, social groups, etc.). Based on the user's role in one or more groups, each user may have associated responsibilities in relation to one or more groups and the various events associated with the one or more groups. One or more relationships, dependencies, or life situations, can be defined, learned, or determined between these responsibilities across one or more groups. Also, one or more actions taken leading to a scheduled event or cognitive understanding of an unscheduled event can be defined, learned, or determined that may be critical, necessary, or required to achieving optimal success.

The present invention provides for a cognitive system to learn and understand a user's (e.g., members) role within one-to-many groups and understanding a number of life's events (e.g., activities of daily living "ADL" that happen daily and that may or may not be scheduled on a calendar). The cognitive system may assist and/or manage one or more choices, options, events/sub-events, solutions, or a combination thereof throughout a person's day. Given that decision options may be constantly changing temporally as one or more events (e.g., ADL events), the present invention provides the cognitive system that can learn, determine, and/or manage life's daily events, analyze all options available to achieve optimal success for life's events, and propose ranked recommended option(s) calculated using a rigidity factor. The cognitive system that can learn, determine, and/or manage one or more actions during a selected time period to achieve a preferred, optimized, selected daily outcome.

In an additional aspect, the present invention provides for cognitively optimizing scheduling of events/appointments within a group of members, based on established relationships and responsibilities each member has in association with the events/appointments. More specifically, mechanisms of the illustrated embodiments provide for cognitively optimizing and scheduling events/appointments within a group of members. A relationship may be established between an event/appointment from calendar/non-calendar events and a member within a group (e.g., work group, family group, social group, etc.). A rigidity factor (e.g., a rank or weighing factor) may be assigned against the event/appointment within a schedule for the group of members, based on inflexibility of occurrence of event. Events within the calendar/non-calendar events may be prioritized. The present invention may recommend rescheduling, changing, updating, and/or altering one or more unscheduled/conflicting events of among the members of the group.

The so-called "optimization" of scheduling of events/sub-events, options, ADLs, activities, outcomes such as a scheduled meeting, may be very subjective and context dependent particularly between one or more groups. Optimization may be defined as an act, process, or operation of making the best or most effective use of a situation, resource, events/sub-events, options, ADLs, activities, outcomes, or a combination thereof. Optimization may be the maximization or minimization of a quantity or a combination of quantities, a maximum of an objective function. Also, optimization may be defined as learning, identifying, determining, and/or finding a best configuration for intelligent event scheduling and prioritizing that balances resources, events/sub-events, options, ADLs, activities, outcomes, and/or user experience for one or more members of the group. Accordingly, the so-called "optimization" of may depend greatly upon contextual factors, such as a one-to-many user relationships, and other contextual factors such as, for example, the resources, events/sub-events, options, ADLs, activities, outcomes, and/or user experience.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of emotions and/or behaviors, leading to a "learning" of one or more events, operations, or processes. Thus, the cognitive model may, over time, develop semantic labels to apply to observed emotions and/or behaviors and use a knowledge domain or ontology to store the learned observed emotions and/or behaviors. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

In an additional aspect, a knowledge domain may be used and may include an ontology of concepts representing a domain of knowledge. A thesaurus or ontology may be used as the domain knowledge and may also be used to associate various characteristics, attributes, symptoms, behaviors, sensitivities, parameters, user profiles, group profiles, and/or relationships and/or responsibilities between one or more users and/or events/sub-events. In one aspect, the term "domain" is a term intended to have its ordinary meaning. In addition, the term "domain" may include an area of expertise for a system or a collection of materials, information, content and/or other resources related to a particular subject or subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
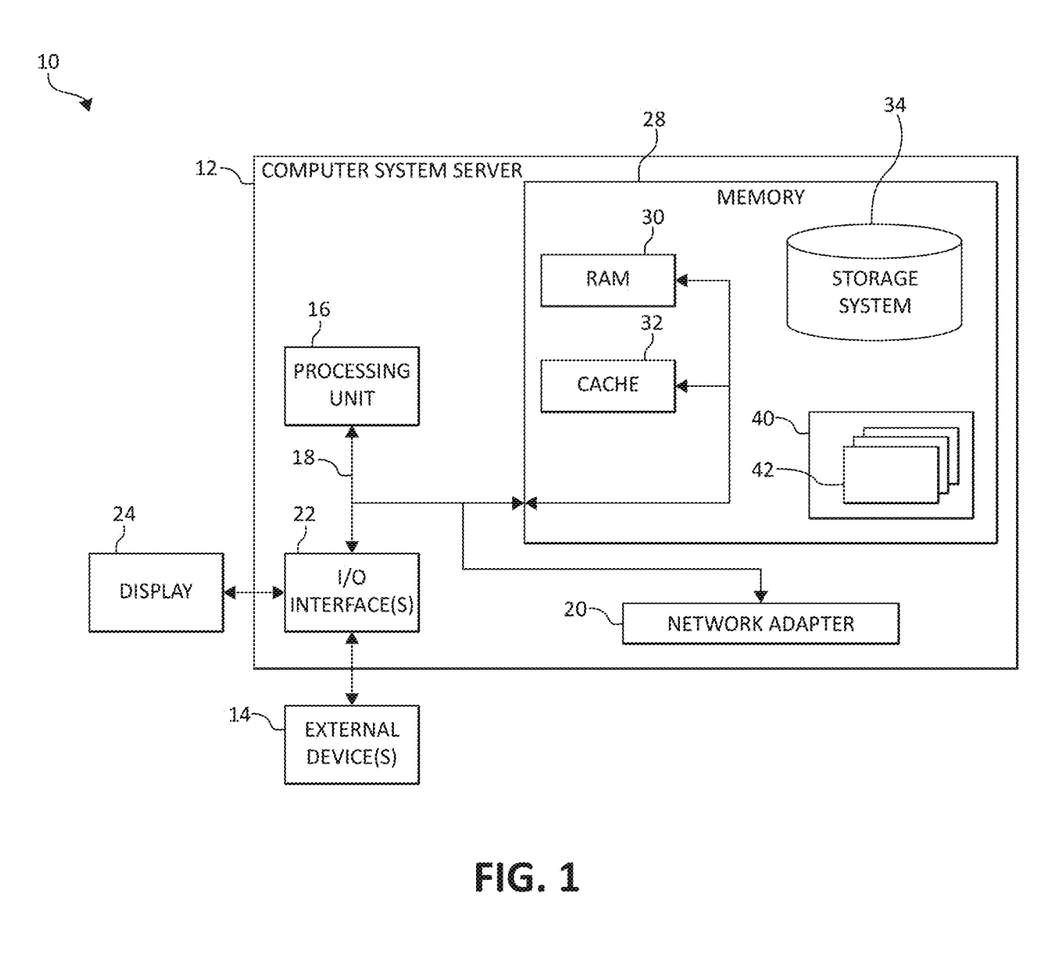
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
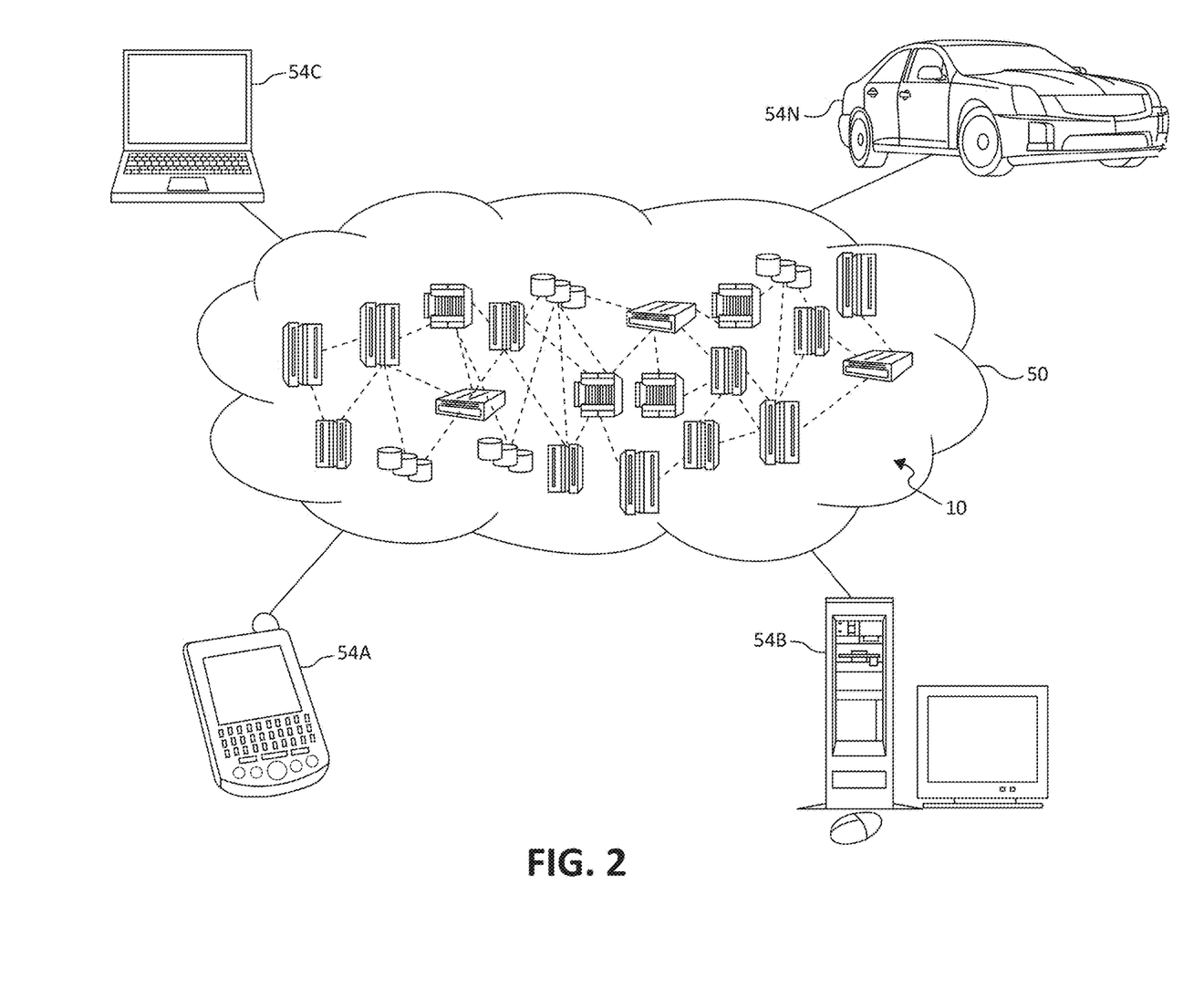
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
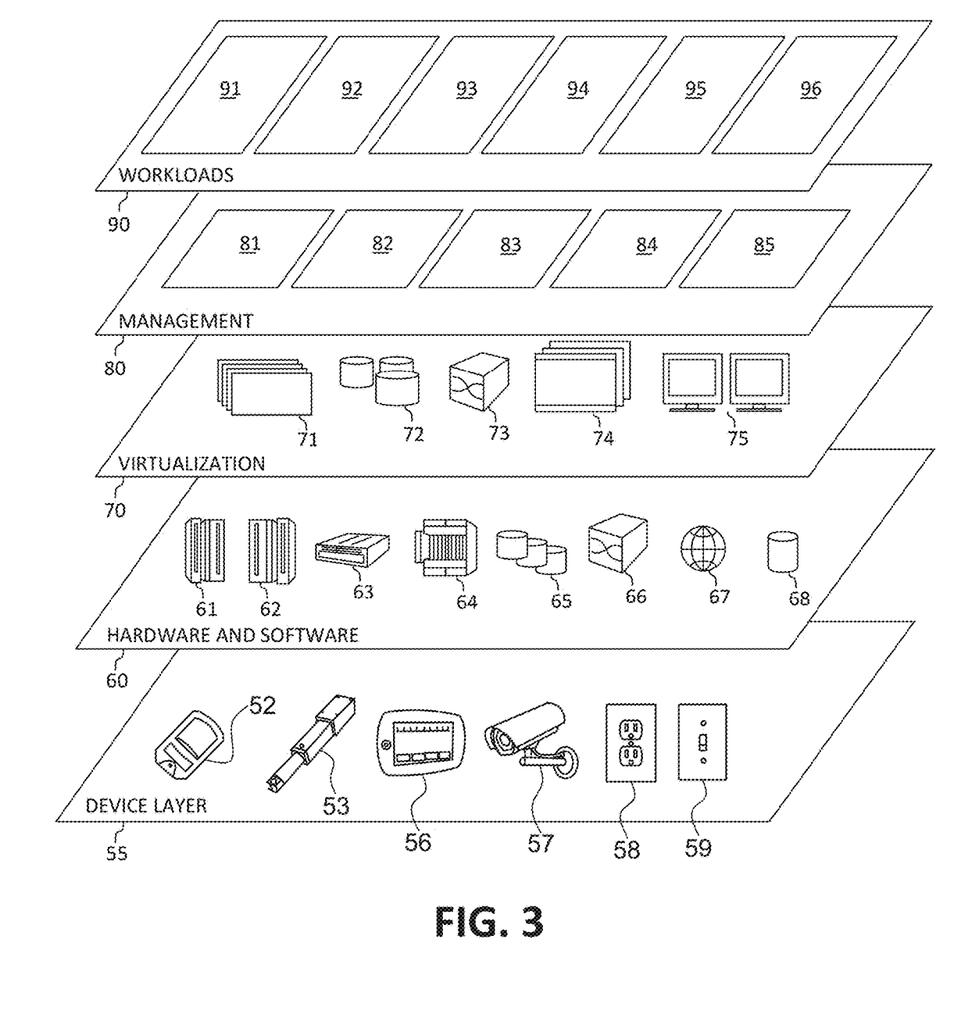
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent scheduling of events. In addition, workloads and functions 96 for intelligent scheduling of events may include such operations as data analytics, data analysis, and as will be further described, notification functionality. One of ordinary skill in the art will appreciate that the workloads and functions 96 for intelligent scheduling of events may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the optimizing and scheduling of tasks (e.g., calendar events/inferred calendar events) between a group of users/members (e.g., family group, working group, social group, political group, etc.) sharing responsibility for accomplishing one or more tasks by optimizing a breakdown of tasks among the group of users/members. In addition, the present invention provides for assigning a reschedulable parameter to reflect the difficulty required to reschedule the event/appointment (and/or sub-events/sub-appointments) during a conflict of other events/appointments, which may be reassigned/rescheduled of the scheduled/unscheduled events based on one or more defined or selected criteria and load balancing priority. The present invention further provides for dynamically evaluating the context of a user for prioritizing events such as, for example, within a calendar and/or inferred calendar event for automatically updating an unscheduled/conflicting event among the group members.

Figure 4:
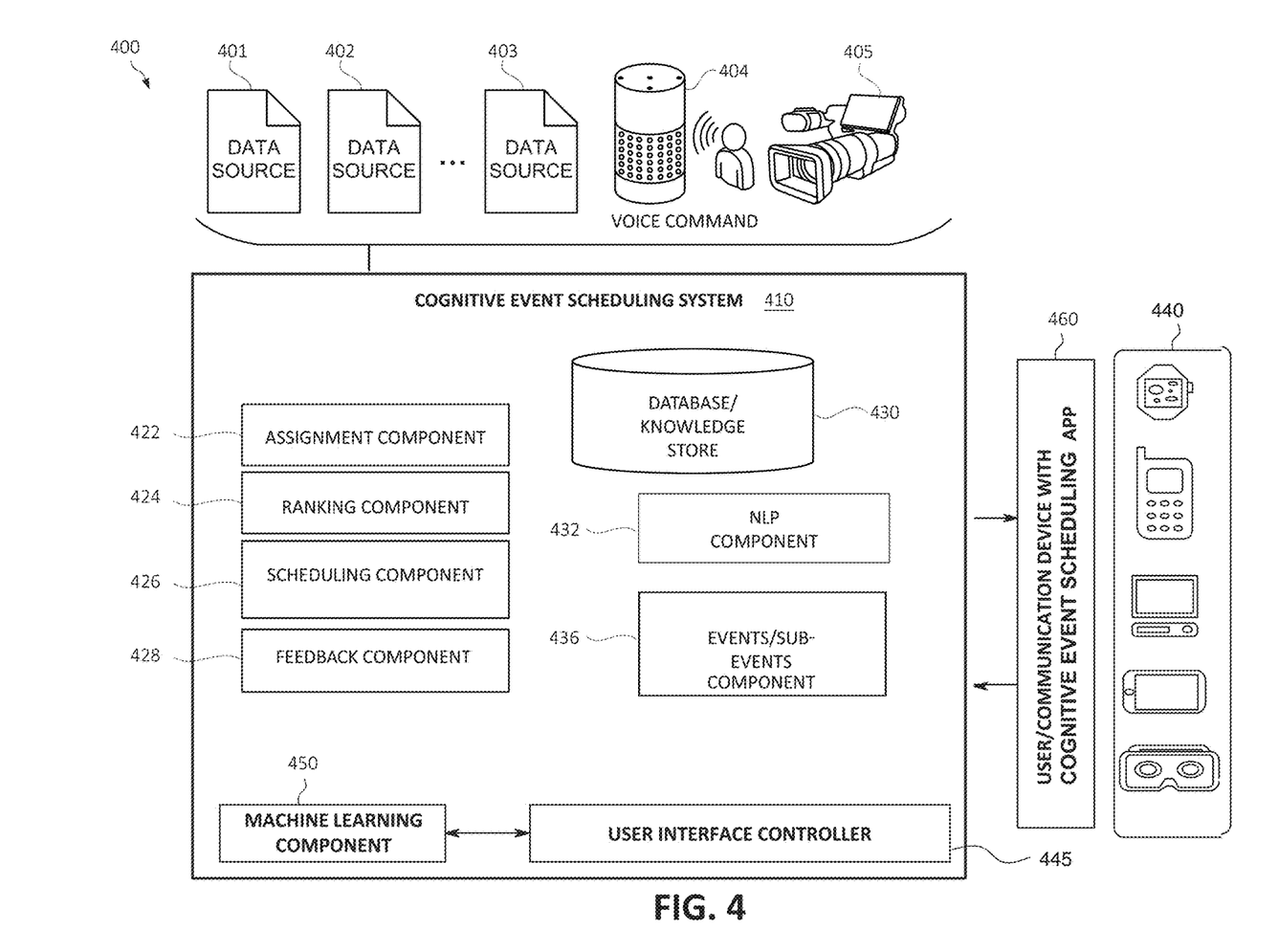
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. FIG. 4 illustrates intelligent scheduling of events in a computing environment, such as a cognitive event scheduling system 410 that may be included in a computing environment, according to an example of the present technology. As will be seen, many of the functional blocks may also be considered "modules" or "components" of functionality, in the same descriptive sense as has been previously described in FIGS. 1-3. For example, computer system/server 12 of FIG. 1 may be used in association with FIG. 4 and may be connected to other computing nodes and/or one or more Internet of Things (IoT) devices over a distributed computing network, where additional data collection, processing, analytics, and other functionality may be realized. The computer system/server 12 of FIG. 1, may include functional components 400 of the cognitive event scheduling system 410 in order to collect, analyze, and process text data, images, video data, audio data, sensor data, or a combination thereof collected from the various computing devices and/or sensors. With the foregoing in mind, the module/component blocks 400 may also be incorporated into various hardware and software components of a system for intelligent scheduling of events in accordance with the present invention. Many of the functional blocks 400 may execute as background processes on various components, either in distributed computing components, or on the user device, or elsewhere.

The system 400 may include the computing environment such as, for example, a cognitive event scheduling system 410, user equipment(s) ("UE") 440 (e.g., one or more communications having a cognitive event scheduling applications 460 installed thereon), such as a desktop computer, laptop computer, tablet, wireless communication device (e.g., a smartphone), vehicular communication system, or on-board navigation system, and/or another electronic device that may have one or more processors and memory (e.g., computing devices 54A-N as described in FIG. 2). The cognitive event scheduling system 410 and the UEs 440 may each be associated with and/or in communication with each other by one or more communication methods, such as a computing network.

In one aspect, the cognitive event scheduling system 410 may be included in a computing system that provides virtualized computing services (i.e., virtualized computing, virtualized storage, virtualized networking, etc.) to UEs 440. More specifically, the cognitive event scheduling system 410 may be included in a computing system that provides virtualized computing, virtualized storage, virtualized networking and other virtualized services that are executing on a hardware substrate.

As depicted in FIG. 4, the cognitive event scheduling system 410 may include an assignment component 422, a ranking component 424, a scheduling component 426, a feedback component 428, a database/knowledge store 430, a natural language processing "NLP" component 432, a ("UI") controller 445, a machine learning component 450, and/or an events/sub-events component 436.

The cognitive event scheduling system 410 may be in communication with multiple data sources 401-405. Multiple data sources 401-405 may be provided by one or more content contributors (e.g., one or more group members). In one aspect, the data sources 401-405 may be the UEs 440 or be in association with the UEs 440. For example, data source 405 may defined as one of the UEs 440 and/or included as part of UE 440. Alternatively, data sources 401-405 may be external to the UEs 440, but may be in communication with each other. For example, data source 401 may be a calendar stored in a cloud computing environment that may be accessed, updated, modified, and/or altered by one or more of the UEs.

The data sources 401-405 may be provided as a corpus or group of data sources defined and/or identified. The data sources 401-405 may include, but are not limited to, data sources relating to one or more documents, materials related to calendars, emails, books, papers, messages, online journals, journals, articles, drafts, audio data, video data, and/or other various documents or data sources capable of being published, displayed, interpreted, transcribed, or reduced to text data. The data sources 401-405 may be all of the same type, for example, pages or articles in a wiki or pages of a blog (e.g., a blog having a list of events/schedules such as, for example, after-school events/schedules for children in a family along with other family events). Alternatively, the data sources 401-405 may be of different types, such as word documents, wikis, web pages, power points, printable document format, or any document (e.g., a school calendar of events published on a web page of a school attended by one or more members of a group, etc.) capable of being analyzed by a natural language processing system.

In addition to text-based documents, other data sources such as audio, video or image sources may also be used wherein the audio, video or image sources may be pre-analyzed to extract or transcribe their content for natural language processing, such as converting from audio to text and/or image analysis. For example, a voice command issued by a content contributor may be detected by a voice-activated detection device 404 and record each voice command or communication. The recorded voice command/communication may then be transcribed into text data for natural language processing. As an additional example, a video capturing device 405 (e.g., a camera) may record a video for broadcasting the captured video to remote locations where various other content contributors may collaborate remotely. The video data captured by the video capturing device 405 may be analyzed and transcribed into images or text data for natural language processing. The group of data sources 401-405 are consumed for the NLP component 432 to extract and process data using NLP and artificial intelligence (AI) to provide processed content.

The data sources 401-405 may be analyzed by the NLP component 432 to data mine or transcribe relevant information from the content of the data sources 401-405 (e.g., calendars, documents, emails, messages, reports, notes, audio records, video recordings, live-streaming communications, etc.) in order to display the information in a more usable manner and/or provide the information in a more searchable manner. The NLP component 432 may be provided as a cloud service or as a local service.

The NLP component 432 may be associated with the data sources 401-405. The NLP component 432 may be used for receiving data from the data sources 401-405 and running NLP and AI tools against the data sources 401-405, learning the content, such as by using the machine learning component 450. It should be noted that other components of FIG. 4 may also employ one or more NLP systems and the NLP component 432 is merely illustrated by way of example only of use of an NLP system. As the NLP component 432 (including the machine learning component 450) learns different sets of data, the NLP component 432 may use the artificial intelligence to make cognitive associations or links between one or more users or member of a group of members by determining relationships, responsibilities, common concepts, methods, features, similar characteristics, schedules, events, decision elements, alternatives to a decision, alternative options/choices/events, decision criteria, concepts, suggestions and/or an underlying common activity.

The NLP component 432 and/or the machine learning component 450 may each be an AI system that uses artificial reasoning to interpret the data sources 401-405 and extract their data. The learned relationships, responsibilities, common concepts, methods, features, similar characteristics, schedules, events/sub-events, dependencies of events/sub-events, decision elements, alternatives to a decision, alternative options/choices/events, decision criteria, concepts, suggestions and/or an underlying common activity, may not be specifically named or mentioned in the data sources 401-405 and is derived or inferred by the AI interpretation.

The learned content of the data sources 401-405 consumed by the NLP system may be merged into a database 430 (and/or knowledge store) or other data storage method of the consumed content with learned events, schedules, tasks, ADL, decisions, alternatives, criteria, subjects, topics, ideas, relationships, responsibilities, concepts, user profiles, user behavior, schedules of each of a group of members, events/sub-events, dependencies of events/sub-events, decision elements, alternatives to a decision, alternative options/choices/events, decision criteria, concepts, suggestions, underlying common activities, and/or features of the data sources 401-405 providing association between the content referenced to the original data sources 401-405.

The database 430 may also work in conjunction with the NLP component 432 to maintain a timestamped record of all interactions and contributions of each data source 401-405 and/or UE. The database 430 may record and maintain the evolution of events, schedules, tasks, ADL, decisions, alternatives, criteria, subjects, topics, ideas, relationships, responsibilities, concepts, user profiles, user behavior, schedules of each of a group of members, events/sub-events, dependencies of events/sub-events, decision elements, alternatives to a decision, alternative options/choices/events, decision criteria, concepts, suggestions, underlying common activities, and/or features discussed in the data sources 401-405.

The database 430 may track, identify, and associate all communication threads, messages, transcripts, and the like of all data generated during all stages of the development or "life cycle" of the events, schedules, tasks, ADL, decisions, alternatives, criteria, subjects, topics, ideas, relationships, responsibilities, concepts, user profiles, user behavior, schedules of each of a group of members, events/sub-events, dependencies of events/sub-events, decision elements, alternatives to a decision, alternative options/choices/events, decision criteria, concepts, suggestions, underlying common activities, and/or features. The merging of the data into one database 430 (which may include a domain knowledge) allows the scheduling component 426 to act like a search engine, but instead of keyword searches, it will use an AI method of making cognitive associations between the data sources using the deduced concepts.

The events/sub-events component 436 may be a list of events, sub-events, activities, tasks, calendar data (e.g., scheduled events/activities/tasks), non-calendar events/activities/tasks, and/or a variety of events/sub-events associated with each member of a group. More specifically, the events/sub-events component 436 may include a prioritized ranking or preferred order of execution of each of the events/sub-events. That is, as one or more events/sub-events are determined, updated, modified, and/or rescheduled, the events/sub-events component 436 may update the list of ranked events/sub-events. For example, working in conjunction with ranking component 424, if a top ranked prioritized event is canceled or rescheduled, the events/sub-events component 436 and the ranking component 424 may reorder/re-rank the events/sub-events and dependencies of the events/sub-events. In this way, the ranking may be interactive, dynamic, and intelligent.

The assignment component 422 and the scheduling component 426 may cognitively assign and/or schedule one or more events to one or more members from a plurality of group members according to learned relationships and responsibilities associated with the one or more events and the plurality of group members. The assignment component 422 and the scheduling component 426 may cognitively assign and/or schedule one or more sub-events relating to the one or more events.

The assignment component 422 may also establish a relationship between the one or more events and the one or more members from the plurality of group members.

The ranking component 424 may determine, calculate, and/or assign a rank (e.g., a rigidity factor) to the one or more events according to a type of the one or more events, an ability to perform the one or more events by each of the plurality of group members, a level of inflexibility, or a combination thereof. That is, each member/participant in the plurality of group members may receive an assigned rigidity factor by the ranking component 424 for the various levels each participant is authorized to perform for the event task. In addition, the event may also have rigidity factors assigned by the ranking component 424 to the type of event solutions. The ranking component 424 may prioritize the one or more events according to an assigned rank of the one or more events.

In association with the ranking component 424, the scheduling component 426 may reschedule, alter, update, or cancel one or more conflicting events in relation to the prioritized one or more events. The assignment component 422 may also assign, delegate, or reassign one or more members to perform the one or more events, execute decisions for the one or more events, manage the one or more events, or a combination thereof according to an assigned rank.

As an additional aspect, the cognitive event scheduling system 410 (e.g., via the scheduling component 426 and/or the machine learning component 450) may provide for dynamic cross mapping of cognitive patterns to enable the scheduled/unscheduled events and/or routines of one or more members of the group to be instantaneously shared with the other members of the group. Thus, a group cluster of cognitive cross mapping relationships may be stored in the database 430 so that a ranking (e.g., rigidity factors) of the events and/or members may be adjusted accordingly based on learning the priority of the event and the comfort zones of the various members of the group involved in the cluster to perform a specific task. Depending on the importance of the task and the events of the various members involved in the cluster of members, the events/sub-events and/or tasks may be dynamically shared and assigned (distributed based on convenience) to the respective parties in the group.

For example, assume a parent (e.g., mother) picks up their children from school after coming from work in the afternoon while the other parent (e.g., father) is currently busy and at work. If the mother, however, becomes suddenly busy with an unscheduled meeting, the cognitive event scheduling system 410 (which may form a cognitive group cluster) may learn and recognize the unexpected event (e.g., the unscheduled meeting) based on one or more parameters, factors, geolocation, sensor data collected from one or more IoT devices (e.g., wearable devices that may be one or more of the UEs 440), or monitored activities with the linked devices (e.g., UEs 440). The scheduling component 426 may provide and send a notification to one or more members with a most probable rigidity factor (e.g., rigidity factor above a selected threshold (greater than 85%) such as, for example, a rigidity factor of 90%, which is greater than the selected threshold of 85%) to pick up the kids from school (e.g., the father and/or a grandparent). The dynamic, cognitive cross mapping stored in the database 430 may enable the cognitive event scheduling system 410, increasing the efficiency and complexity of one or more members and/or UEs 440 in handling daily routines and unscheduled events.

The UI controller 445 may be used to provide access to the cognitive event scheduling system 410 for each one of the UEs 440.

The feedback component 428 may be used to collect feedback information from the user in association with the one or more UEs 440. Also, the feedback component 428 may provide collected feedback to the machine learning component 450 and/or the NLP component 432.

The machine learning component 450, in association with the feedback component 428, may initialize a machine learning operation for collecting feedback information from one or more of the plurality of group members (e.g., from UEs 440) to assign, modify, update, or alter the one or more events. The machine learning component 450 may learn the relationships and responsibilities between the one or more events and the one or more users in association with the UEs 440. The machine learning component 450 may also learn an ability of each one of the plurality of group members to perform the one or more events or sub-events relating to the one or more events. Additionally, the machine learning component 450 may collect and/or learn one or more user preferences, one or more events and/or sub-events, activities of daily living (ADL), tasks and/or sub-tasks, and/or other events associated with one or more of the group of members. The feedback component 428 may also be used to receive feedback of a "choice selected" and to adjust the rigidity factors (e.g., the rankings) of that event's participants.

One or more machine learning modules may be developed, learned, and/or built for providing one or more functions of the cognitive event scheduling system. For example, the machine learning component 450 may apply multiple combinations of factors, parameters, policies, user preferences, ADLs of the user, behavior characteristics, calendar schedules, historical data (e.g., previously optimized scheduled events), learned behavior data, learned rankings of events/activities, learned order of preferred events/activities, event and/or sub-event dependencies, user capabilities (e.g., abilities or capabilities for performing a task or event), or a combination thereof to the machine learning model for cognitive event scheduling operations.

In one aspect, the machine learning modeling, as described herein, may be performed using a wide variety of methods or combinations of methods, such as supervised learning (e.g., MCMC filters, Kalman filters, particle filters, etc.), unsupervised learning, temporal difference learning, reinforcement learning and so forth. That is, the machine learning modeling may learn parameters of one or more physical models. The machine learning modeling may be employed in the category of parameter estimation of state-space models, which may be completed by unsupervised learning techniques, particularly to learn the context and/or the indicators. Some non-limiting examples of supervised learning which may be used with the present technology include Kalman filters, particle filters, MCM filters, AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Additionally, the cognitive event scheduling system 410 may perform one or more calculations for cognitive event scheduling according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

With the foregoing functional components of FIGS. 1-4 in view, consider the present invention in operation using the examples below. Consider a group of members such as, for example, a family group where each family member has a role with associated responsibilities (e.g., formally documented on a schedule, calendar, email, text data, media data, etc.). A parent may be assigned the responsibility as the primary caregiver or provider in seeing to certain family needs such as, for example, providing shelter, meals, transportation to and from activities, paying bills. etc. Assume there are numerous events which occur in a typical family daily life such as, for example, a child's baseball game at 5:00 PM for which the family usually attends.

Because of the complexity and difficulty for the parent to effectively review and understand all options available for optimally selecting or choosing the daily events for maximum success (e.g., choosing the best choice for their family), the mechanisms of the illustrative embodiments provide for intelligent scheduling by learning and understanding all the available options for optimizing the ADLs, activities, events, tasks, or selected activities. The cognitive scheduling system may provide a rank or priority or execution, and/or determine those of the events/sub-events to perform and those alternative events/sub-events to cancel, reschedule, or modify. The present invention provides a cognitive scheduling system to understand each role in the group (e.g., the family group) and considers a schedule of events (e.g., a documented schedule) as well as cognitively learned and determined non-documented responsibilities such as, for example, making sure the family dinner is cooked and prepared in time to ensure attendance of the child's baseball game.

As time gets closer to family dinner, which typically is not documented on schedules, the cognitive scheduling system can propose one or more selected (e.g., optimal) recommendations for the family dinner time. The cognitive scheduling system can suggest leaving work at a specific time so that a certain type of event may be executed such as, for example, the meal can be cooked, served, consumed and cleaned up while still having sufficient time to travel to and attend the child's baseball game. As time progresses without parental action and/or decision, the cognitive scheduling system may update one or more of the recommendations based on available time and may include one or more options based on a variety of dependencies or factors such as, for example, family food preferences, the location of food services/restaurants, traffic changes and blockages, changes to other family member schedules, the cost of the meal, etc. The top selected or ranked recommendations may ensure that a defined critical event (in this case being on time for the baseball game) trumps the time of the less critical event (e.g., the family dinner), and provides one or more selected (e.g., best or optimized) alternatives, options, or other events/tasks to be on time for the game.

Additionally, the cognitive scheduling system may provide one or more statistics with the ranked suggestions regarding how often certain types of events (e.g., dinners) have been occurring to help make better choices such as, for example, family prepared meals as compared to purchased meals and/or meals served at home as compared with fast food consumed on the road. Simply stated, the cognitive scheduling system may compare various options, sub-events, activities, or alternative solutions to accomplish one or more prioritized events, which may be in a hierarchy of prioritized events (e.g., the attendance of the baseball game ranks higher or "more critical" for execution as compared to a lesser ranked task of having a family meal). As such, to ensure execution of the higher ranked and/or important/ required task (e.g., the attendance at the baseball game), one or more alternative options may be provided or recommended for complying with a lesser ranked event, as compared to the higher ranked task (e.g., a family dinner). Accordingly, the cognitive scheduling system may recommend, for example, ordering and picking up a meal (e.g., "take out"), prepared by a restaurant and taking it home, which may eliminate extensive time for preparing a meal. The cognitive scheduling system may also recommend the restaurant based on learned user behavior such as, for example, user travel preference while returning home from work.

If no action is taken regarding the event (e.g., dinner) within sufficient time to eat and go to the game, the cognitive scheduling system can propose post critical event solutions such as, for example, eating dinner from the concessions stand at the baseball game or eating a meal at a restaurant after the game. The cognitive scheduling system may also compensate, in real-time, if the game was canceled or delayed. For example, if the baseball game event is canceled, the cognitive scheduling system may reschedule the event and offer updated options for the family meal, which is now the top ranked or "most critical" event to be performed in a selected time range. The cognitive scheduling system may also consider and take into account the other family roles and responsibilities as part of the cognitive learning and understanding of possible solutions such as, for example, another family member (e.g., a teenage child) may have already prepared the dinner at home instead of a working parent.

In an additional aspect, the cognitive scheduling system may be applied to one or more users who participate in many groups such as, for example, a family group, a social group (e.g., a book club or sports team), and work groupings. The cognitive scheduling system may learn and understand each role-based responsibility of the combination of groups for the user and extend application of learning and understanding the roles/responsibilities for the user across multiple groups with documented schedules and undocumented cognitively understood responsibilities and events. The cognitive scheduling system provides ranked choices and alternatives to enable the one or more users to better understand available choices and alternatives that were previously unavailable, undetermined, unknown, or even available to user. Thus, the cognitive scheduling system alleviates the stress of making thousands of more decisions each day and instead allows a participant user to focus on decisions that require more attention, for example, work decisions.

For each of these events, the cognitive scheduling system may add a rigidity factor that would encapsulate the idea of how inflexible a user is when it comes to the user's schedules or how one event activity is more critical as compared to another event when considering the overall optimal success of one's day. For example, assume on most days that 75% of the time a user goes running during a selected time period (e.g., running from 7 until 8 a.m.), however on some days the runner (e.g., member A) starts at 6 a.m. or after 8 a.m. because the runner had a conflict. As such, the rigidity factor for this event may be defined as a ranked value or a percentage (e.g., 75%). On the other hand, if a person (e.g., member B) 99% of the time goes to pick up his/her child at daycare at 5:00 p.m., the rigidity factor for this event may be assigned as 99%. When the cognitive scheduling system (for another person, such as, member C) is trying to schedule something on member B's calendar, the cognitive scheduling system may consider the rigidity factor of each of these events before deciding whether member B can actually schedule something at that time (e.g., 5:00 p.m.) or not. The rigidity factor may be expressed by a ranked value, a percentage, and/or even a change of color (or pop up alert system on the screen) on an interactive graphical user interface ("GUI") for an appointment slot in a calendar for the cognitive scheduling system trying to schedule something for another member during the time someone is already booked. This would indicate whether that person may accept the invite or not. The rigidity factor (e.g., a weighted value) may be used during the teaching, learning, and understanding using machine learning of the cognitive scheduling system to learn priority and importance of daily life events for each member of the group.

It should be noted that initial learning via a machine learning operation establishes relationships and what responsibilities a member of the group has with regards to the event. In the example of preparing the family dinner meal, the machine learning operation may learn, for example, that only certain members (e.g., persons over the age of 12) could cook a hot meal (e.g., hamburgers) but children under the age of 12 may be able to prepare a cold meal (e.g., sandwiches) for the family. During the learning by the machine learning operation, the rigidity factor (weighting factor) may be assigned based on those members of the group that may have the primary responsibility for making decisions and/or taking actions to achieve the success of the events. Each participant in the group may receive the assigned rigidity factor for the various levels each participant is authorized to perform for the event task. In addition, the event may also have rigidity factors assigned to the type of event solutions. For the evening meal example, a high rigidity factor (e.g., a rigidity factor above a predetermined threshold or percentage) may be assigned to having a hot cooked meal, while a lower factor (e.g., a rigidity factor below a predetermined threshold or percentage) may be assigned to a cold, prepared meal. Thus, optimally ranked proposed solutions and/or suggestions may be a combination of multiple considerations such as, for example, both the type of meal (e.g., event) and those persons that may be able to manage and/or prepare the meal (e.g., tasks and sub-tasks of the event).

It should be noted that following the learning and selection of an option, choice, and/or solution, feedback related to the selected option, choice, and/or solution may be used to adjust the rigidity factors of that event's participants. For example, if a grandparent is able to make the hot family meal but was not initially ranked high in the proposed optional choices for dinner solutions, then the grandparent's rigidity factor may be increased, and others not selected in the ranked list may be decreased (which may include lowering the rigidity factor).

Figure 5:
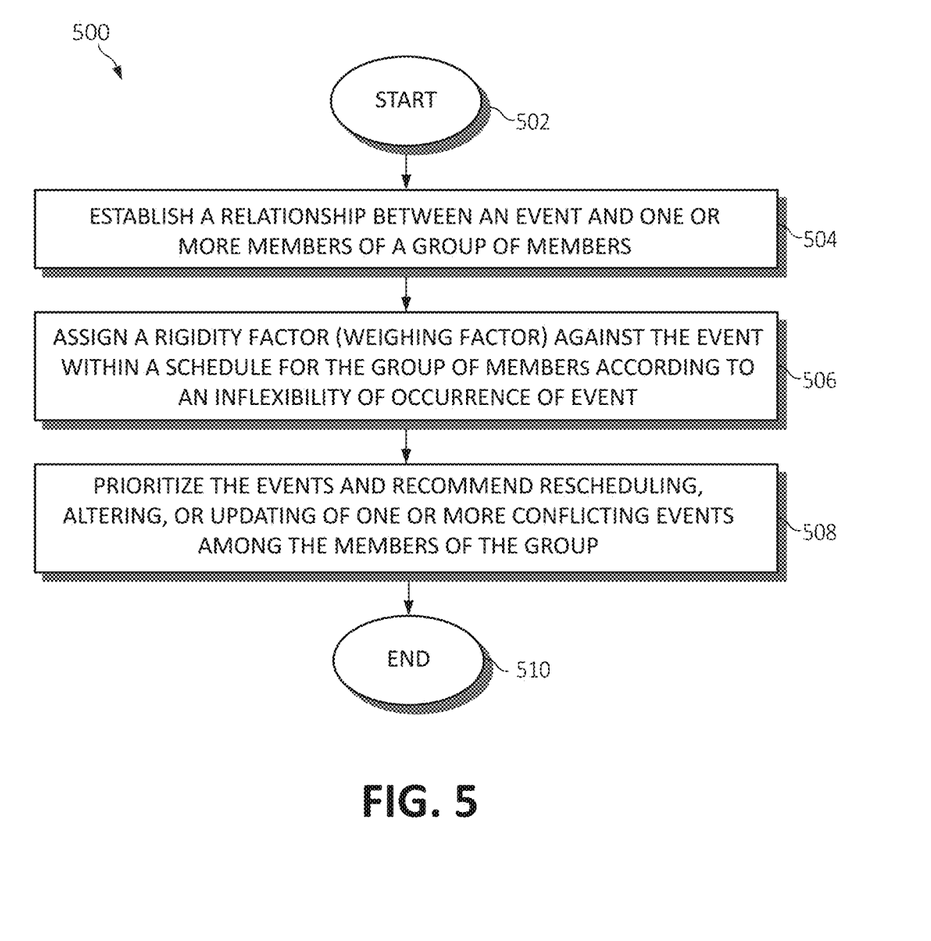
FIG. 5 is a flowchart diagram depicting an additional exemplary method for intelligent scheduling of events in which various aspects of the present invention may be realized.

Turning now to FIG. 5, a method 500 for intelligent scheduling of events using a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. In one aspect, the functionality, operations, and/or architectural designs of FIGS. 1-4 may be implemented all and/or in part in FIG. 5.

The functionality 500 may start in block 502. A relationship (and/or responsibilities) may be established between an event and one or more members of a group of members, as in block 504. A rigidity factor (weighing factor) may be assigned against the event within a schedule for the group of members according to an inflexibility of occurrence of event, as in block 506. One or more events may be prioritized (in relation to the other events and/or sub-events) and recommend rescheduling, altering, or updating of one or more conflicting events (and/or conflicting sub-events) that may be impacted by, and/or in association with, the one or more prioritized events among the members of the group, as in block 508. The functionality 500 may end, as in block 510.

Figure 6:
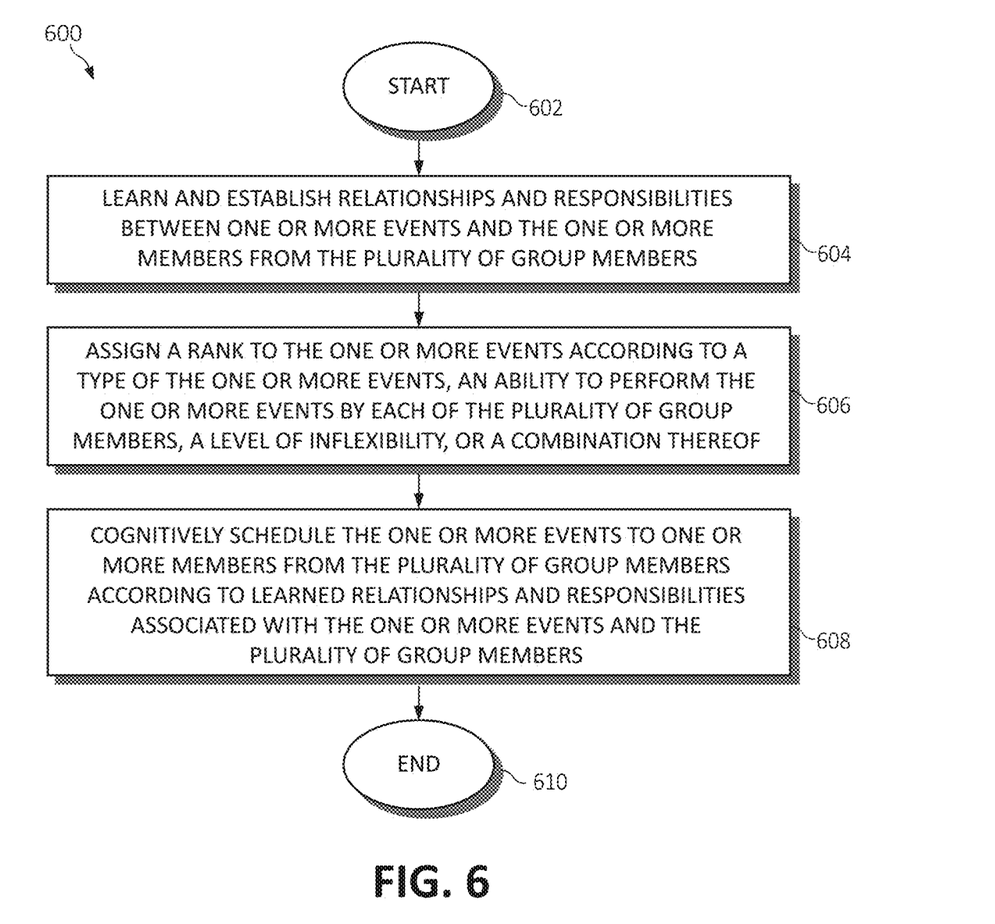
FIG. 6 is an additional flowchart diagram depicting an additional exemplary method for intelligent scheduling of events, again in which various aspects of the present invention may be realized.

Turning now to FIG. 6, a method 600 for intelligent scheduling of events using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-4 may be implemented all and/or in part in FIG. 6.

The functionality 600 may start in block 602. One or more relationships and responsibilities may be learned and established between one or more events and one or more members from the plurality of group members, as in block 604. A rank (or weighted value) may be assigned to the one or more events according to a type of the one or more events, an ability to perform the one or more events by each of the plurality of group members, a level of inflexibility, or a combination thereof, as in block 606. The one or more events may be cognitively scheduled for one or more members from the plurality of group members according to learned relationships and responsibilities associated with the one or more events and the plurality of group members, as in block 608. The functionality 600 may end, as in block 610.

In one aspect, in conjunction with and/or as part of at least one block of FIGS. 5-6, the operations of methods 500 and 600 may include each of the following. The operations of methods 500 and 600 may cognitively schedule one or more sub-events relating to the one or more events. Each relationship and/or responsibility may be learned, defined, or established between the one or more events (and/or sub-events) and the one or more members from the plurality of group members.

The operations of methods 500 and 600 may assign a rank to the one or more events according to a type of the one or more events, an ability to perform the one or more events by each of the plurality of group members, a level of inflexibility, or a combination thereof. The operations of methods 500 and 600 may prioritize the one or more events according to an assigned rank of the one or more events, and/or reschedule, alter, update, or cancel one or more conflicting events in relation to the prioritized one or more events. One or more members may be assigned and/or scheduled to perform the one or more events, execute decisions for the one or more events, manage the one or more events, or a combination thereof according to an assigned rank.

The operations of methods 500 and 600 may initialize a machine learning mechanism for: collecting feedback information from one or more of the plurality of group members to assign, modify, update, or alter the one or more events; learning the relationships and responsibilities between the one or more events and the one or more users; and/or learning an ability of each one of the plurality of group members to perform the one or more events or sub-events relating to the one or more events.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:
1. A method for intelligent scheduling of events by a processor, comprising:

receiving, by the processor, data from a plurality of data sources each storing information associated with each member of a plurality of group members;

generating, by the processor, a machine learning model having learned relationships and responsibilities interdependent within the plurality of group members according to an analyzation of the data;

determining, by the processor according to the machine learning model, one or more members from the plurality of group members to assign one or more events thereto according to the learned relationships and responsibilities associated with the one or more events and the plurality of group members, wherein the one or more events include documented events and non-documented events learned based on the learned relationships and responsibilities, and wherein certain events of the documented events and the non-documented events are identified as needing to be requisitely performed at certain, non-prescheduled times in order for the one or more members to participate in subsequent events of the one or more events;

cognitively and automatically scheduling, by the processor, the one or more events as assigned to the one or more members, wherein the one or more members are optimally selected from the plurality of group members to be assigned particular tasks of the one or more events according to a ranking based on a plurality of factors related to the learned relationships and responsibilities determined using the machine learning model, and wherein automatically scheduling the one or more events includes notifying those of the one or more members that sub-events of the certain events must be completed at a certain time, as determined by the automatic scheduling, to complete the certain events identified as needing to be requisitely performed to thereby subsequently participate in the subsequent events of the one or more events;

detecting, by the processor using sensor data collected by a user device associated with the one or more members, an anomaly that will cause the one or more members assigned to the one or more events unable to perform the scheduled one or more events; and cognitively reassigning, by the processor, the one or more events to an alternative member of the plurality of group members having a rigidity factor above a predetermined threshold such that the alternative member of the plurality of group members assumes sole responsibility to perform the one or more events, wherein, commensurate with the reassigning, a timing and location of the one or more events remains unchanged.

2. The method of claim 1, further including cognitively scheduling one or more sub-events relating to the one or more events.

3. The method of claim 1, further including establishing a relationship between the one or more events and the one or more members from the plurality of group members.

4. The method of claim 1, further including assigning a rank to the one or more events according to a type of the one or more events, an ability to perform the one or more events by each of the plurality of group members, a level of inflexibility, or a combination thereof.

5. The method of claim 1, further including:
prioritizing the one or more events according to an assigned rank of the one or more events; and
rescheduling, altering, updating, or canceling one or more conflicting events in relation to the prioritized one or more events.

6. The method of claim 1, further including assigning one or more members to perform the one or more events, execute decisions for the one or more events, manage the one or more events, or a combination thereof according to an assigned rank.

7. The method of claim 1, further including initializing the machine learning model for:
  collecting feedback information from one or more of the plurality of group members to assign, modify, update, or alter the one or more events;
  learning the relationships and responsibilities between the one or more events and the one or more users; or
  learning an ability of each one of the plurality of group members to perform the one or more events or sub-events relating to the one or more events.

8. A system for intelligent scheduling of events, comprising:
  one or more computers with executable instructions that when executed cause the system to:
    receive, by a processor executing the executable instructions, data from a plurality of data sources each storing information associated with each member of a plurality of group members;
    generate, by the processor, a machine learning model having learned relationships and responsibilities interdependent within the plurality of group members according to an analyzation of the data;
    determine, by the processor according to the machine learning model, one or more members from the plurality of group members to assign one or more events thereto according to the learned relationships and responsibilities associated with the one or more events and the plurality of group members, wherein the one or more events include documented events and non-documented events learned based on the learned relationships and responsibilities, and wherein certain events of the documented events and the non-documented events are identified as needing to be requisitely performed at certain, non-prescheduled times in order for the one or more members to participate in subsequent events of the one or more events;
    cognitively and automatically schedule, by the processor, the one or more events as assigned to the one or more members, wherein the one or more members are optimally selected from the plurality of group members to be assigned particular tasks of the one or more events according to a ranking based on a plurality of factors related to the learned relationships and responsibilities determined using the machine learning model, and wherein automatically scheduling the one or more events includes notifying those of the one or more members that sub-events of the certain events must be completed at a certain time, as determined by the automatic scheduling, to complete the certain events identified as needing to be requisitely performed to thereby subsequently participate in the subsequent events of the one or more events;
    detect, by the processor using sensor data collected by a user device associated with the one or more members, an anomaly that will cause the one or more members assigned to the one or more events unable to perform the scheduled one or more events; and
    cognitively reassign, by the processor, the one or more events to an alternative member of the plurality of group members having a rigidity factor above a predetermined threshold such that the alternative member of the plurality of group members assumes sole responsibility to perform the one or more events, wherein, commensurate with the reassigning, a timing and location of the one or more events remains unchanged.

9. The system of claim 8, wherein the executable instructions cognitively schedule one or more sub-events relating to the one or more events.

10. The system of claim 8, wherein the executable instructions establish a relationship between the one or more events and the one or more members from the plurality of group members.

11. The system of claim 8, wherein the executable instructions assign a rank to the one or more events according to a type of the one or more events, an ability to perform the one or more events by each of the plurality of group members, a level of inflexibility, or a combination thereof.

12. The system of claim 8, wherein the executable instructions:
  prioritize the one or more events according to an assigned rank of the one or more events; and
  reschedule, alter, update, or cancel one or more conflicting events in relation to the prioritized one or more events.

13. The system of claim 8, wherein the executable instructions assign one or more members to perform the one or more events, execute decisions for the one or more events, manage the one or more events, or a combination thereof according to an assigned rank.

14. The system of claim 8, wherein the executable instructions initialize the machine learning model for:
  collecting feedback information from one or more of the plurality of group members to assign, modify, update, or alter the one or more events;
  learning the relationships and responsibilities between the one or more events and the one or more users; or
  learning an ability of each one of the plurality of group members to perform the one or more events or sub-events relating to the one or more events.

15. A computer program product for intelligent scheduling of events by a processor, the computer program product comprising a non-transitory computer-readable storage medium having computer-readable program code portions stored therein, the computer-readable program code portions comprising:
  an executable portion that receives, by the processor, data from a plurality of data sources each storing information associated with each member of a plurality of group members;
  an executable portion that generates, by the processor, a machine learning model having learned relationships and responsibilities interdependent within the plurality of group members according to an analyzation of the data;
  an executable portion that determines, by the processor according to the machine learning model, one or more members from the plurality of group members to assign one or more events thereto according to the learned relationships and responsibilities associated with the one or more events and the plurality of group members, wherein the one or more events include documented events and non-documented events learned based on the learned relationships and responsibilities, and wherein certain events of the documented events and the non-documented events are identified as needing to be requisitely performed at certain, non-prescheduled times in order for the one or more members to participate in subsequent events of the one or more events;

an executable portion that cognitively and automatically schedules, by the processor, the one or more events as assigned to the one or more members, wherein the one or more members are optimally selected from the plurality of group members to be assigned particular tasks of the one or more events according to a ranking based on a plurality of factors related to the learned relationships and responsibilities determined using the machine learning model, and wherein automatically scheduling the one or more events includes notifying those of the one or more members that sub-events of the certain events must be completed at a certain time, as determined by the automatic scheduling, to complete the certain events identified as needing to be requisitely performed to thereby subsequently participate in the subsequent events of the one or more events;

an executable portion that detects, by the processor using sensor data collected by a user device associated with the one or more members, an anomaly that will cause the one or more members assigned to the one or more events unable to perform the scheduled one or more events; and an executable portion that cognitively reassigns, by the processor, the one or more events to an alternative member of the plurality of group members having a rigidity factor above a predetermined threshold such that the alternative member of the plurality of group members assumes sole responsibility to perform the one or more events, wherein, commensurate with the reassigning, a timing and location of the one or more events remains unchanged.

16. The computer program product of claim 15, further including an executable portion that cognitively schedules one or more sub-events relating to the one or more events.

17. The computer program product of claim 15, further including an executable portion that establishes a relationship between the one or more events and the one or more members from the plurality of group members.

18. The computer program product of claim 15, further including an executable portion that:

assigns a rank to the one or more events according to a type of the one or more events, an ability to perform the one or more events by each of the plurality of group members, a level of inflexibility, or a combination thereof;

prioritizes the one or more events according to the assigned rank of the one or more events; and reschedules, alters, updates, or cancels one or more conflicting events in relation to the prioritized one or more events.

19. The computer program product of claim 15, further including an executable portion that assigns one or more members to perform the one or more events, executes decisions for the one or more events, manages the one or more events, or a combination thereof according to an assigned rank.

20. The computer program product of claim 15, further including an executable portion that initializes the machine learning model for:

collecting feedback information from one or more of the plurality of group members to assign, modify, update, or alter the one or more events;

learning the relationships and responsibilities between the one or more events and the one or more users; or learning an ability of each one of the plurality of group members to perform the one or more events or sub-events relating to the one or more events.

\* \* \* \* \*